D. BEATTY.
THERMOSTAT.
APPLICATION FILED JAN. 23, 1912.

1,046,543.

Patented Dec. 10, 1912.

WITNESSES

INVENTOR
David Beatty,
BY
Wright,
ATTORNEY

UNITED STATES PATENT OFFICE.

DAVID BEATTY, OF BERKELEY, CALIFORNIA.

THERMOSTAT.

1,046,543.  Specification of Letters Patent.  Patented Dec. 10, 1912.

Application filed January 23, 1912. Serial No. 672,805.

*To all whom it may concern:*

Be it known that I, DAVID BEATTY, a citizen of the United States, residing at Berkeley, in the county of Alameda and State of California, have invented new and useful Improvements in Thermostats, of which the following is a specification.

The present invention relates to improvements in thermostats, the object of the invention being to provide a thermostat which will operate under very minute differences of temperature, and at the same time may be regulated to operate at any temperature within wide ranges.

A further object is to provide a thermostat of this character which will be extremely accurate in its operation.

Figure 1:
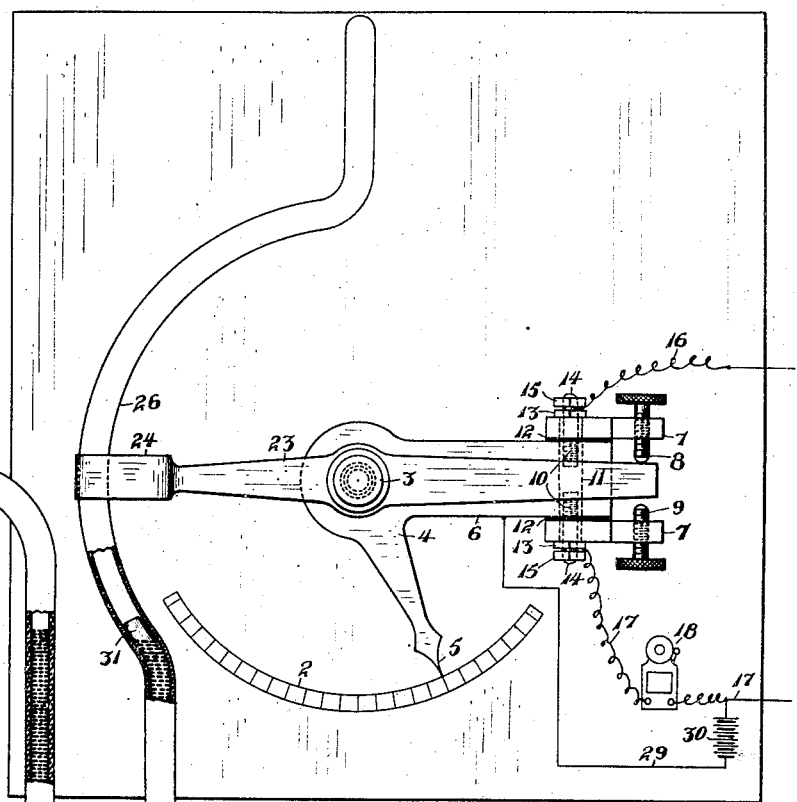
Figure 2:
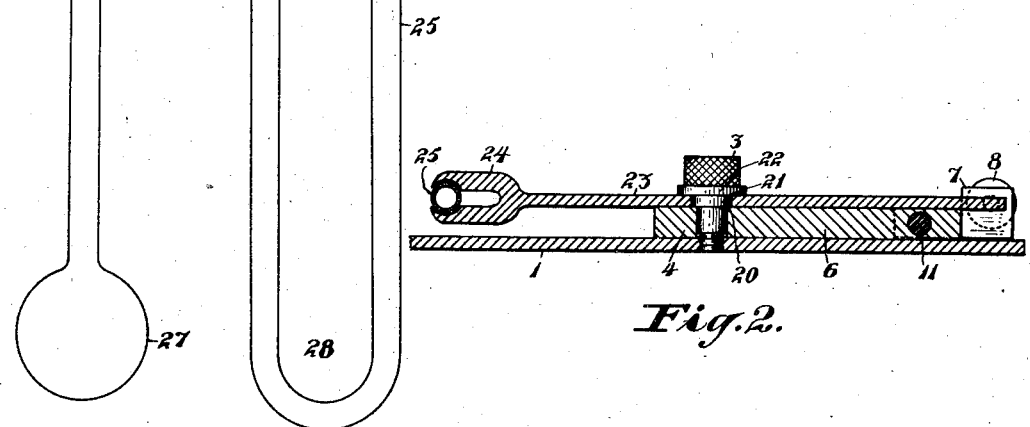

In the accompanying drawing, Figure 1 is a front view of a thermostat of my improved construction, certain electric portions of the apparatus being shown diagrammatically; Fig. 2 is a transverse section thereof.

Referring to the drawing, 1 indicates a plate, on which is formed in any suitable manner a graduated circular dial 2. At the center of said dial there is secured, by a thumb screw 3 screwed into said plate, an indicator 4, having a pointer 5, the outer end of which moves in proximity to the graduations on the dial, and also having an arm 6. To the outer end of said arm 6 are clamped two contact plates 7, the outer terminal portions of said plates 7 being threaded to receive contact screws 8, 9, in alinement with, and directed toward, each other. Said plates are clamped against opposite edges of said arm, by means of screws 10 screwed into a plug 11 of insulating material in said arm, sheets 12 of mica being interposed between the arm 6 and said plates 7. Each screw is double-ended, that is, having a head 13 in the middle, and a threaded portion 14 extending outwardly as well as inwardly therefrom, and upon said outer threaded portions 14 are screwed nuts 15 to clamp between said nuts 15 and the heads 13 of the screws the ends of conducting wires 16, 17, of which one wire 16 leads direct, and the other 17 through an electric device, as a bell 18.

The indicator is adjustably clamped to the main plate 1 by means of a shoulder 20 upon the thumb screw, which shoulder abuts against said indicator, and a smooth portion 21 of said thumb screw, between its head 22 and said shoulder, forms a pivot upon which can swing at its center an arm 23, one end of which extends between the points of the two contact screws 8, 9. The other end carries a horseshoe magnet 24, the two members of which extend on opposite sides of a tube 25, of which a portion 26 is formed in an arc of a circle having the pivot 21 as center. The arm 23 is accurately balanced so as to swing when the least force is applied thereto. Said tube 25 leads from a vessel 27 of suitable size containing air or other gas, and from said vessel it extends in a direction forming a U-shaped portion or trap 28. From one member of said U-shaped portion extends the arcuate portion 26 of the tube before described. In said U-shaped portion is contained a sufficient quantity of a suitable liquid, such as mercury or oil. Upon the liquid is supported an iron float 31, made hollow in case the liquid used should be other than mercury, and therefore lighter than iron. The upper end of the tube, remote from the vessel 27, is closed, and the air is exhausted from the tube between the liquid and said upper end. A conductor 29 with a battery 30 therein leads from the wire 17 to the indicator 4.

The following is the mode of operation of the device:—Supposing that it be desired that, when any given temperature is attained, an electrical device be actuated, as, for instance, to cut off the supply of heat, the thumb screw 3 is loosened and the indicator 4 is moved until the pointer 5 points to the graduation on the dial indicating the desired temperature. The indicator is then clamped rigidly in position. The arm will now continue in contact with the contact screw 8, so long as the temperature remains below the desired degree. But if the temperature rises, the air or other gas contained in the vessel and tube expands, causing the mercury and float to move along the tube. On arriving at point therein in proximity to the magnet, the float, being made of iron, will attract said magnet so that the arm remains in contact with the screw 8, and then when the mercury rises, it will move the arm 23 away from the screw 8 breaking the circuit through said contact 8, so that the former electrical action ceases, and into contact with the other screw 9, and thus close a circuit to ring the bell.

It will be understood that the electrical part of the apparatus here shown merely illustrates one way among many in which my thermostatic apparatus can be used. In certain cases, it may be preferable to use mercury only, without air, as the expanding fluid, or to use a liquid fluid in the place of air.

I claim:—

1. The combination of a closed vessel, a tube leading therefrom formed with a trap, air contained in said vessel, mercury in said trap, a float in said tube supported by said mercury, a movable magnet outside said tube, but in proximity to said float, a pivoted arm connected to said magnet, an electrical contact carried by said arm and a conductor with which said contact is adapted to contact, said conductor being movably supported co-axially with said arm.

2. The combination of a closed vessel, a tube leading therefrom formed with a trap, air contained in said vessel, mercury in said trap, a float in said tube supported by said mercury, a movable magnet outside said tube but in proximity to said float, a pivoted arm connected to said magnet, a pair of electrical contacts carried by said arm, an arm extending between said contacts and adjustable on a pivot co-axially with the first-named pivot, a pointer connected to said latter arm, and a graduated scale over which said pointer moves.

In testimony whereof I have hereunto set my hand in the presence of two subscribing witnesses.

DAVID BEATTY.

Witnesses:
   FRANCIS M. WRIGHT,
   D. B. RICHARDS.